(12) United States Patent
Kijima

(10) Patent No.: US 12,043,276 B2
(45) Date of Patent: Jul. 23, 2024

(54) SUPPORT DEVICE

(71) Applicant: TOYOTA JIDOSHA KABUSHIKI KAISHA, Toyota (JP)

(72) Inventor: Yoshitaka Kijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 17/893,694

(22) Filed: Aug. 23, 2022

(65) Prior Publication Data

US 2023/0130322 A1    Apr. 27, 2023

(30) Foreign Application Priority Data

Oct. 25, 2021  (JP) .................................. 2021-174050

(51) Int. Cl.
| | | |
|---|---|---|
| G08G 1/09 | (2006.01) | |
| B60W 40/105 | (2012.01) | |
| B60W 50/14 | (2020.01) | |
| G06V 10/56 | (2022.01) | |
| G06V 20/58 | (2022.01) | |

(52) U.S. Cl.
CPC .......... *B60W 50/14* (2013.01); *B60W 40/105* (2013.01); *G06V 10/56* (2022.01); *G06V 20/584* (2022.01); *B60W 2420/403* (2013.01); *B60W 2554/4029* (2020.02); *B60W 2554/80* (2020.02); *B60W 2555/60* (2020.02)

(58) Field of Classification Search
CPC ............... B60W 50/14; B60W 40/105; B60W 2420/403; B60W 2554/4029; B60W 2554/80; B60W 2555/60; B60W 2556/55; B60W 30/181; B60W 30/18154; G06V 10/56; G06V 20/584; G06V 20/58

See application file for complete search history.

(56) References Cited

U.S. PATENT DOCUMENTS

| | | | | |
|---|---|---|---|---|
| 10,458,810 | B2* | 10/2019 | Fasola | ..................... G06V 10/25 |
| 10,507,807 | B2* | 12/2019 | Ben Shalom | ............. B60T 7/12 |
| 11,210,571 | B2* | 12/2021 | Kwant | .................. G06V 20/584 |
| 2019/0012551 | A1* | 1/2019 | Fung | ....................... G06F 18/24 |
| 2019/0347492 | A1 | 11/2019 | Morimura et al. | |
| 2021/0053566 | A1 | 2/2021 | Kobayashi et al. | |

FOREIGN PATENT DOCUMENTS

| | | |
|---|---|---|
| JP | 2006-244295 A | 9/2006 |
| JP | 2011-180683 A | 9/2011 |
| JP | 2016-122362 A | 7/2016 |
| JP | 2019-197467 A | 11/2019 |
| WO | 2019/022201 A1 | 1/2019 |

* cited by examiner

*Primary Examiner* — Toan N Pham

(74) *Attorney, Agent, or Firm* — Oliff PLC

(57) ABSTRACT

A support device is a support device by which a support operation to support a host vehicle to stop is performable. The support device includes: a determination unit configured to, when a light color of a traffic light is a light color that requires the host vehicle to stop, determine whether or not alerting on the traffic light is performed as the support operation, based on a speed of the host vehicle and a distance from a current position of the host vehicle to a stop reference position; and a recognition unit configured to recognize a surrounding state around the host vehicle. The stop reference position in a case where a crossing pedestrian is recognized by the recognition unit is closer to the host vehicle than the stop reference position in a case where no pedestrian is recognized by the recognition unit.

4 Claims, 5 Drawing Sheets

SUPPORT DEVICE

CROSS-REFERENCE TO RELATED APPLICATION

This application claims priority to Japanese Patent Application No. 2021-174050 filed on Oct. 25, 2021, incorporated herein by reference in its entirety.

BACKGROUND

1. Technical Field

The present disclosure relates to the technical field of a support device for supporting a driver to drive a vehicle.

2. Description of Related Art

As this type of device, there has been proposed, for example, a device for notifying an alert to the approach to an intersection (see Japanese Unexamined Patent Application Publication No. 2011-180683 (JP 2011-180683A)). The device predicts the time when a vehicle traffic light turns yellow based on a color change in a pedestrian traffic light and also predicts the time when a vehicle arrives at the intersection. In a case where the vehicle cannot arrive at the intersection during a period when the vehicle traffic light is green, the device notifies the alert. As another related art, there is a technology described in WO 2019/022201. WO 2019/022201 describes a device for executing a deceleration process to prevent a host vehicle from entering a dilemma zone before a traffic light.

SUMMARY

The timing when a driver who has noticed that the light color of the traffic light has turned yellow or red starts the deceleration operation varies depending on the driver. Accordingly, there is such a possibility that, when alerting is performed for the driver at the timing when the light color of the traffic light has just turned yellow or red, for example, the driver might feel annoyed. Further, there is room for improvement in the related art described above.

The present disclosure is accomplished in view of the above problem, and an object of the present disclosure is to provide a support device that can support a driver appropriately in accordance with light color change in a traffic light.

A support device according to one aspect of the disclosure is a support device by which a support operation to support a host vehicle to stop is performable. The support device includes a determination unit and a recognition unit. The determination unit is configured to, when a light color of a traffic light is a light color that requires the host vehicle to stop, determine whether or not alerting on the traffic light is performed as the support operation, based on a speed of the host vehicle and a distance from a current position of the host vehicle to a stop reference position. The recognition unit is configured to recognize a surrounding state around the host vehicle. The stop reference position in a case where a crossing pedestrian is recognized by the recognition unit is closer to the host vehicle than the stop reference position in a case where no pedestrian is recognized by the recognition unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
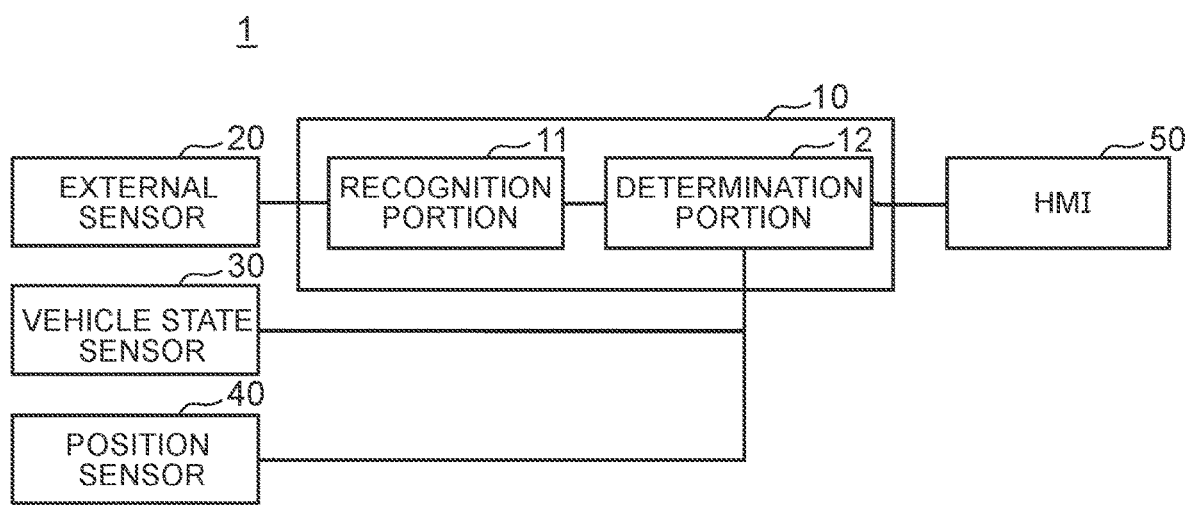
FIG. 1 is a block diagram illustrating a configuration of a support device according to an embodiment.

A support device according to an embodiment will be described with reference to FIGS. 1 to 5. In FIG. 1, a support device 10 is provided in a vehicle 1. The vehicle 1 includes an external sensor 20, a vehicle state sensor 30, a position sensor 40, and a human machine interface (HMI) 50.

The external sensor 20 includes a camera configured to capture an image outside the vehicle 1. The external sensor 20 may include, for example, a radar, a light detection and ranging (LiDAR) system, or the like in addition to the camera. The vehicle state sensor 30 includes a speed sensor. The vehicle state sensor 30 may include an acceleration sensor, a yaw rate sensor, or the like, for example, in addition to the speed sensor. The position sensor 40 detects the position of the vehicle 1. Note that existing various configurations can be applied to the external sensor 20, the vehicle state sensor 30, the position sensor 40, and the HMI 50, so that detailed descriptions of them are omitted herein.

The support device 10 recognizes a light color of a traffic light present ahead of the vehicle 1 in its advancing direction based on an image from the camera included in the external sensor 20. When the recognized light color is yellow or red, the support device 10 alerts a driver of the vehicle 1 as a driving support.

Figure 2:
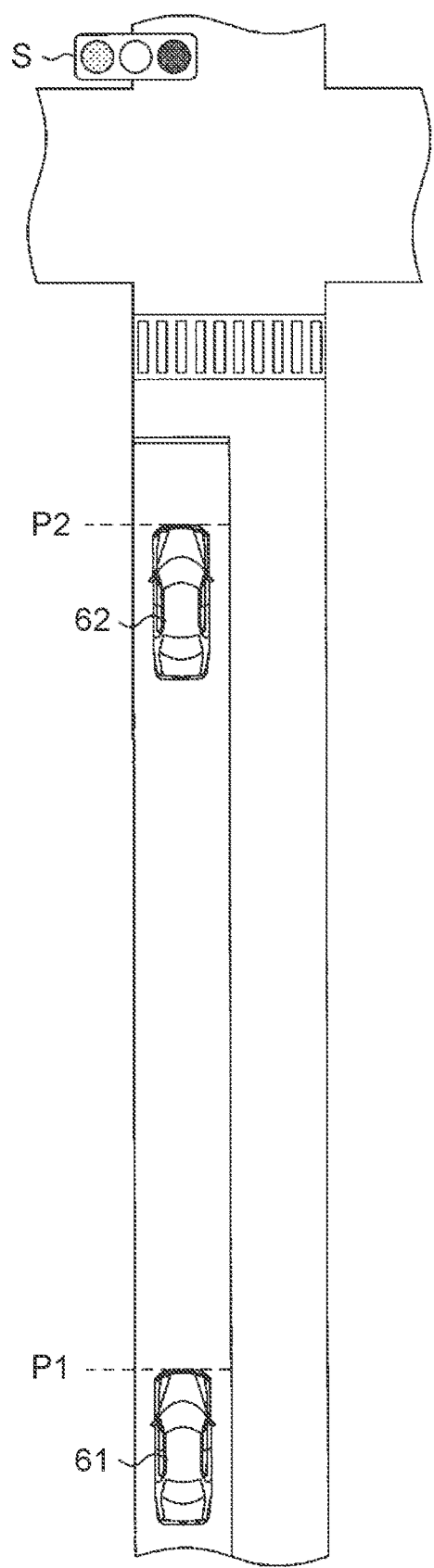
FIG. 2 is a view illustrating one example of a scene where alerting on a traffic light is performed.
Figure 3:
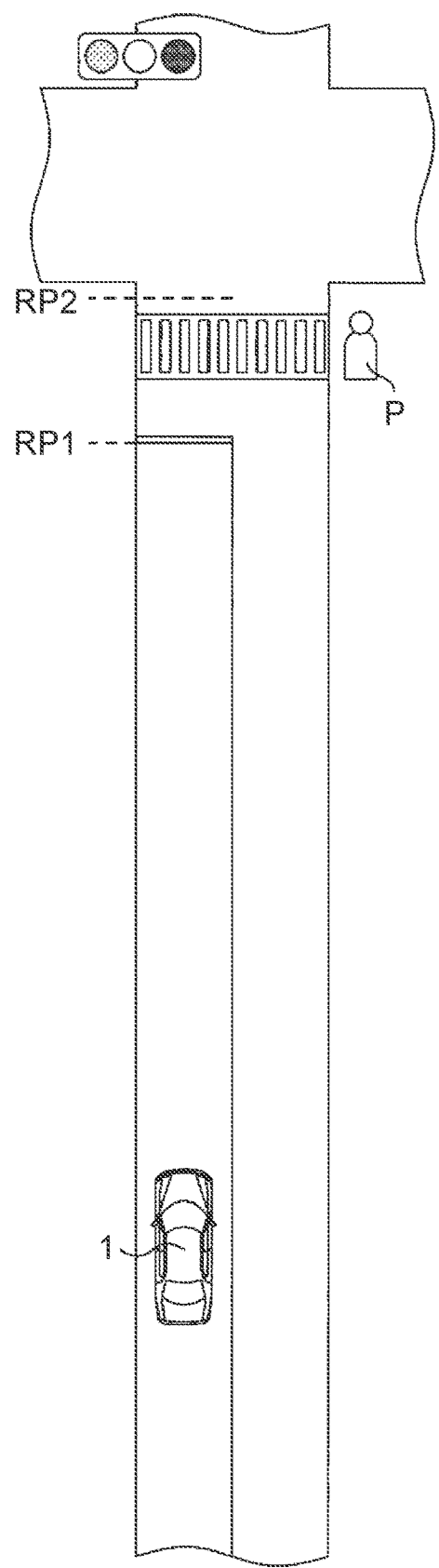
FIG. 3 is a view illustrating one example of a stop reference position for a vehicle.

Here, a problem that can occur at the time when the alerting on the traffic light is performed for the driver will be described with reference to FIG. 2. In FIG. 2, it is assumed that, when a running vehicle 61 reaches a position P1 and a running vehicle 62 reaches a position P2, the light color of a traffic light S turns yellow from green.

A driver of the vehicle 61 performs a deceleration operation of stopping stepping on an accelerator pedal or the like, for example, as follows: (i) immediately after the driver recognizes the light color change in the traffic light S, the driver performs the deceleration operation; or (ii) when the vehicle 61 approaches the traffic light S to some extent after the driver recognizes the light color change in the traffic light S, the driver performs the deceleration operation. In the latter case, when the alerting is performed immediately after the traffic light S turns yellow from green, the drive might feel annoyed.

Further, (i) the driver of the vehicle 62 may determine that it is difficult to stop the vehicle 62 safely and may perform a driving operation so that the vehicle 62 passes through the intersection, or (ii) the driver may step on a brake pedal relatively strongly so that the vehicle 62 stops before the intersection. In the former case, when the alerting is performed due to the light color change in the traffic light S, the drive might feel annoyed.

In view of this, the support device 10 determines whether the alerting on the traffic light is performed or not in consideration of a stopping distance of the vehicle 1. The support device 10 includes a recognition portion 11 and a determination portion 12 as a logical block logically implemented or a processing circuit physically implemented inside the support device 10.

The recognition portion 11 recognizes the light color of the traffic light based on an image or the like from the camera included in the external sensor 20 and also recognizes a pedestrian or the like around the vehicle 1. Note that existing various configurations can be applied to the recognition operation of the recognition portion 11, so that detailed descriptions of the recognition operation are omitted herein.

When the recognition portion 11 recognizes that the light color of the traffic light is yellow or red, the determination portion 12 acquires the speed of the vehicle 1 based on an output from the vehicle state sensor 30. The determination portion 12 calculates the stopping distance of the vehicle 1 based on the acquired speed of the vehicle 1. When the determination portion 12 calculates the stopping distance of the vehicle 1, the determination portion 12 calculates a stopping distance range that the vehicle 1 can take, with reference to a general deceleration speed range at the time of vehicle braking.

At the same time or around the same time as the calculation of the stopping distance, the determination portion 12 determines, based on a recognition result from the recognition portion 11, whether a person (hereinafter referred to as a "crossing pedestrian" as appropriate) waiting for the traffic light to change at a crosswalk ahead of the vehicle 1 in its advancing direction is present or not. When the determination portion 12 determines that the crossing pedestrian (see a reference sign "P" in FIG. 4) is present, the determination portion 12 sets a stop reference position for the vehicle 1 to a position RP1 of a stop line (see FIG. 3), for example. In the meantime, in a case where the determination portion 12 determines that no crossing pedestrian is present (or no crosswalk is present), the determination portion 12 sets the stop reference position for the vehicle 1 to an entrance position RP2 of the intersection (see FIG. 3), for example.

Subsequently, the determination portion 12 specifies a region where the alerting on the traffic light is performed, based on the calculated stopping distance range and the stop reference position for the vehicle 1. The following describes this more specifically with numerical examples. Here, assume a case where the speed of the vehicle 1 is 40 kilometers per an hour, the deceleration speed range is from $3 \text{ m/s}^2$ to $8 \text{ m/s}^2$, and the reaction speed of the driver is 1.5 seconds. In this case, the stopping distance range of the vehicle 1 is from about 24 meters to about 37 meters. In a case where the stop reference position for the vehicle 1 is the position RP1 of the stop line (see FIG. 3), the region where the alerting is performed is a region from about 24 meters to about 37 meters before the position PR1 when it is viewed from the vehicle 1.

Then, the determination portion 12 determines whether or not the vehicle 1 is running within the region where the alerting is performed, based on the region where the alerting is performed and the distance from the current position of the vehicle 1 that is detected by the position sensor 40 to the stop reference position for the vehicle 1. In a case where the determination portion 12 determines that the vehicle 1 is running within the region where the alerting is performed, the determination portion 12 controls the HMI 50 such that the alerting is performed. In the meantime, in a case where the determination portion 12 determines that the vehicle 1 is not running within the region where the alerting is performed, the determination portion 12 controls the HMI 50 such that the alerting is not performed.

Figure 4:
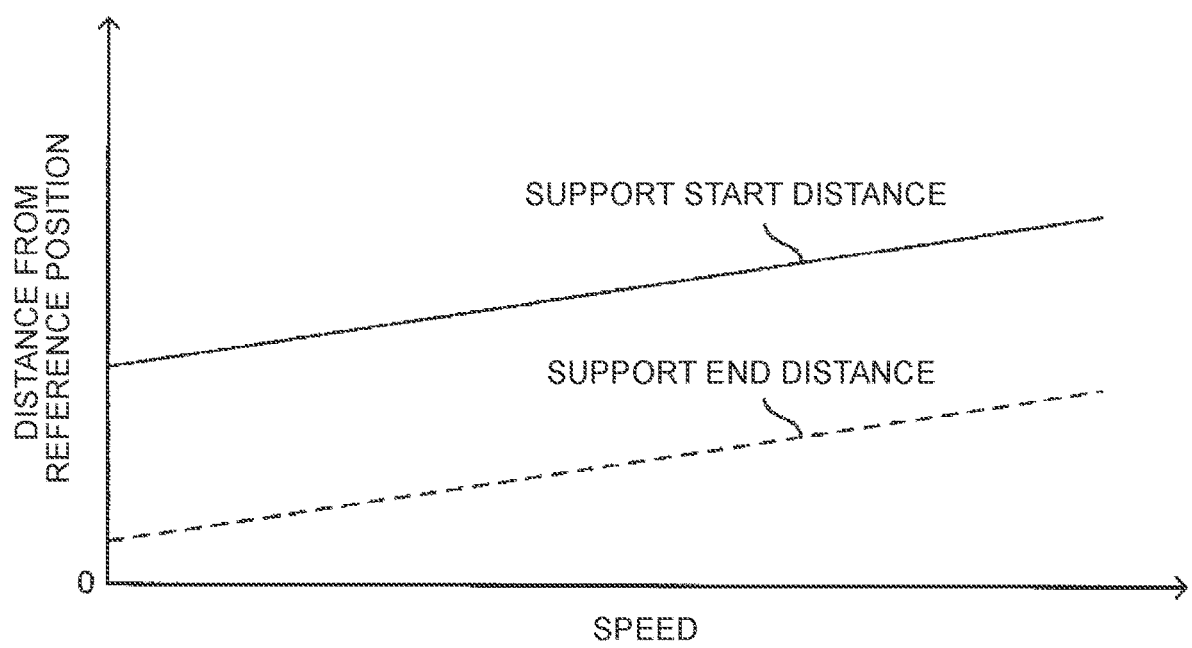
FIG. 4 is a view illustrating one example of a relationship of the speed of the vehicle with a support start distance and a support end distance.

For example, as illustrated in FIG. 4, as the speed of the vehicle 1 is lower, the region where the alerting is performed is closer to the stop reference position for the vehicle 1, and as the speed of the vehicle 1 is higher, the region where the alerting is performed is distanced from the stop reference position for the vehicle 1. Note that, in FIG. 4, a region between a continuous line indicative of the "support start distance" and a broken line indicative of the "support end distance" corresponds to the region where the alerting is performed. In other words, the "support start distance" corresponds to the maximum value of the stopping distance range, and the "support end distance" corresponds to the minimum value of the stopping distance range. The "reference position" in FIG. 4 corresponds to the "stop reference position for the vehicle 1."

Note that the support device 10 may have a map that defines the relationship of the speed with the support start distance and the support end distance as illustrated in FIG. 4, for example. Instead of calculating the stopping distance, the determination portion 12 may specify the region where the alerting is performed, from the map and the speed of the vehicle 1.

Figure 5:
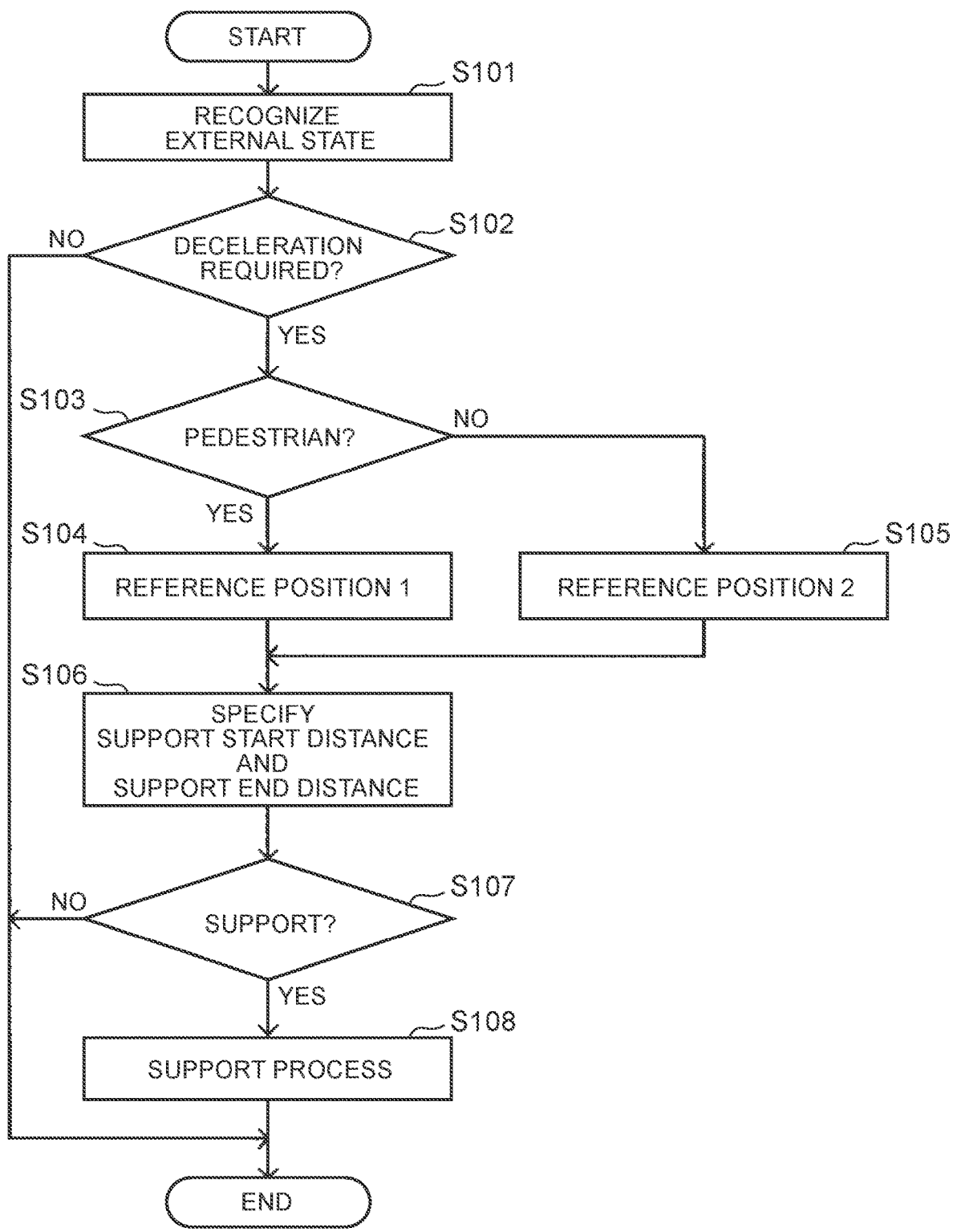
FIG. 5 is a flowchart illustrating the operation of the support device according to the embodiment.

Subsequently described is the operation of the support device 10 with reference to the flowchart of FIG. 5. In FIG. 5, the recognition portion 11 of the support device 10 recognizes the light color of the traffic light and a pedestrian or the like around the vehicle 1, based on the image or the like from the camera included in the external sensor 20 (step S101).

Then, the determination portion 12 determines whether the vehicle 1 needs to be decelerated or not, based on the recognition result from the recognition portion 11 (step S102). Here, in a case where the recognition result indicates that the light color of the traffic light is yellow or red, the determination portion 12 determines that the vehicle 1 needs to be decelerated.

In a case where the determination portion 12 determines, in the process of step S102, that the vehicle 1 does not need to be decelerated (step S102: No), the operation illustrated in FIG. 5 is ended. After that, the process of step S101 may be performed after a predetermined period of time passes. That is, the operation illustrated in FIG. 5 may be performed repeatedly in a cycle corresponding to the predetermined period of time.

In a case where the determination portion 12 determines, in the process of step S102, that the vehicle 1 needs to be decelerated (step S102: Yes), the determination portion 12 determines whether a crossing pedestrian is present or not, based on the recognition result from the recognition portion 11 (step S103).

In a case where the determination portion 12 determines, in the process of step S103, that a crossing pedestrian is present (step S103: Yes), the determination portion 12 sets the stop reference position for the vehicle 1 to a reference position 1 (for example, the position RP1 of the stop line in FIG. 3) (step S104). In the meantime, in a case where the determination portion 12 determines, in the process of step S103, that no crossing pedestrian is present (step S103: No), the determination portion 12 sets the stop reference position for the vehicle 1 to a reference position 2 (for example, the entrance position RP2 of the intersection in FIG. 3) (step S105).

At the same time or around the same time as the processes of steps S103 to S105, the determination portion 12 specifies the support start distance and the support end distance (step S106). The support start distance and the support end distance are distances that define the region where the alerting on the traffic light as the driving support is performed. The support start distance and the support end distance may be specified by calculating the stopping distance corresponding to the speed of the vehicle 1, as described above.

After that, the determination portion 12 specifies the region where the alerting is performed, based on the stop reference position for the vehicle 1 that is set by the process of step S104 or S105, and the support start distance and the support end distance specified by the process of step S106. Then, the determination portion 12 determines whether or not the alerting on the traffic light is to be performed as the driving support, based on the region where the alerting is performed and the distance from the current position of the vehicle 1 that is detected by the position sensor 40 to the stop reference position for the vehicle 1 (step S107).

In a case where the determination portion 12 determines, in the process of step S107, that the alerting on the traffic light is to be performed as the driving support (step S107: Yes), the determination portion 12 controls the HMI 50 such that the alerting is performed for the driver of the vehicle 1 (step S108). In the meantime, in a case where the determination portion 12 determines, in the process of step S107, that the alerting on the traffic light is not to be performed (that is, the driving support is not to be performed) (step S107: No), the operation illustrated in FIG. 5 is ended.

Technical Effects

In the support device 10, the determination portion 12 determines whether or not the alerting on the traffic light as the driving support is to be performed, based on the speed of vehicle 1 and the distance from the current position of the vehicle 1 to the stop reference position. More specifically, the determination portion 12 determines whether or not the alerting on the traffic light is to be performed, based on the distance from the current position of the vehicle 1 to the stop reference position for the vehicle 1 and the region where the alerting is performed, the region being specified based on the stopping distance of the vehicle 1 that corresponds to the speed of the vehicle 1 and the stop reference position for the vehicle 1.

The support device 10 takes the stopping distance of the vehicle 1 into consideration. Accordingly, even in a case where the recognition portion 11 recognizes that the light color of the traffic light is yellow or red, when the vehicle 1 is running at a position relatively distanced from the traffic light and the driver is expected not to perform the deceleration operation, the alerting on the traffic light as the driving support is not performed. Further, even in a case where the recognition portion 11 recognizes that the light color of the traffic light is yellow or red, when the vehicle 1 is running at a position relatively close to the traffic light and it is expected that the vehicle 1 is difficult to stop safely, the alerting on the traffic light as the driving support is not performed.

Further, in the support device 10, the stop reference position for the vehicle 1 is changed depending on presence or absence of a crossing pedestrian. Accordingly, in a case where a crossing pedestrian is present, the alerting on the traffic light as the driving support is performed earlier than a case where no crossing pedestrian is present. With such a configuration, it is possible to avoid a collision between the vehicle 1 and the crossing pedestrian, in addition to the alerting on the traffic light. Further, in a case where no crossing pedestrian is present, the alerting on the traffic light as the driving support is performed longer than the case where a crossing pedestrian is present. With such a configuration, it is possible to restrain reckless passing of the vehicle 1 through the intersection in addition to the alerting on the traffic light.

Thus, with the driving support device 10, it is possible to support the driver appropriately in accordance with the light color change in the traffic light.

Various aspects of the disclosure that are derived from the embodiment described above will be described below.

A support device according to one aspect of the disclosure is a support device by which a support operation to support a host vehicle to stop is performable. The support device includes: a determination unit configured to, when a light color of a traffic light is a light color that requires the host vehicle to stop, determine whether or not alerting on the traffic light is performed as the support operation, based on a speed of the host vehicle and a distance from a current position of the host vehicle to a stop reference position; and a recognition unit configured to recognize a surrounding state around the host vehicle. The stop reference position in a case where a crossing pedestrian is recognized by the recognition unit is closer to the host vehicle than the stop reference position in a case where no pedestrian is recognized by the recognition unit. In the above embodiment, the "recognition portion 11" corresponds to one example of the "recognition unit," and the "determination portion 12" corresponds to one example of the "determination unit."

In the support device, in a case where the distance is within a predetermined range determined based on the speed, the determination unit may determine that the alerting on the traffic light is performed as the support operation. Here, the predetermined range may be determined based on the stop reference position and a stopping distance of the host vehicle based on the speed. Further, an end portion of the predetermined range that is on a side closer to the traffic light may be set on a side closer to the current position of the host vehicle than the stop reference position.

The present disclosure is not limited to the embodiment described above. The present disclosure is modifiable appropriately as far as the modification is not against the gist or idea of the disclosure that can be read from claims and the whole specification. A support device based on such a modification is also within the technical scope of the present disclosure. The present disclosure is applicable to autonomous driving.

What is claimed is:

1. A support device by which a support operation to support a host vehicle to stop is performable, the support device comprising:
   a determination unit configured to, when a light color of a traffic light is a light color that requires the host vehicle to stop, determine whether or not alerting on the traffic light is performed as the support operation, based on a speed of the host vehicle and a distance from a current position of the host vehicle to a stop reference position; and
   a recognition unit configured to recognize a surrounding state around the host vehicle, wherein the stop reference position in a case where a crossing pedestrian is recognized by the recognition unit is closer to the host vehicle than the stop reference position in a case where no pedestrian is recognized by the recognition unit.

2. The support device according to claim 1, wherein, in a case where the distance is within a predetermined range determined based on the speed, the determination unit determines that the alerting on the traffic light is performed as the support operation.

3. The support device according to claim 2, wherein the predetermined range is determined based on the stop reference position and a stopping distance of the host vehicle based on the speed.

4. The support device according to claim 2, wherein an end portion of the predetermined range that is on a side closer to the traffic light is set on a side closer to the current position of the host vehicle than the stop reference position.

* * * * *